US010386818B2

United States Patent
Godfrey et al.

(10) Patent No.: US 10,386,818 B2
(45) Date of Patent: Aug. 20, 2019

(54) QUALITY MANAGEMENT SYSTEMS, METHODS, AND PROGRAM PRODUCTS FOR ADDITIVE MANUFACTURING SUPPLY CHAINS

(71) Applicant: HONEYWELL INTERNATIONAL INC., Morris Plains, NJ (US)

(72) Inventors: Donald G Godfrey, Phoenix, AZ (US); Brian G Baughman, Surprise, AZ (US); Soeren Wiener, Scottsdale, AZ (US); Niranjan Kalyandurg, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 84 days.

(21) Appl. No.: 15/619,172

(22) Filed: Jun. 9, 2017

(65) Prior Publication Data

US 2018/0356796 A1    Dec. 13, 2018

(51) Int. Cl.
*G05B 19/4099* (2006.01)
*B33Y 50/02* (2015.01)
*B29C 64/393* (2017.01)

(52) U.S. Cl.
CPC ........ *G05B 19/4099* (2013.01); *B29C 64/393* (2017.08); *B33Y 50/02* (2014.12); *G05B 2219/32368* (2013.01)

(58) Field of Classification Search
CPC ...... G05B 19/4099; G05B 2219/32368; B33Y 50/02
See application file for complete search history.

(56) References Cited

U.S. PATENT DOCUMENTS

| 2012/0078410 | A1* | 3/2012 | Wong ............... | G06Q 10/06395 700/110 |
| 2013/0079693 | A1* | 3/2013 | Ranky .................. | H01L 41/314 602/28 |

(Continued)

FOREIGN PATENT DOCUMENTS

| WO | 2016115284 A1 | 7/2016 |
| WO | 2017035004 A1 | 3/2017 |

OTHER PUBLICATIONS

Extended EP Search Report for Application No. 18175276.7 dated Oct. 16, 2018.

*Primary Examiner* — Thomas C Lee
*Assistant Examiner* — Michael Tang
(74) *Attorney, Agent, or Firm* — Lorenz & Kopf, LLP

(57) ABSTRACT

Additive Manufacturing Quality Management (AMQM) systems and methods are provided, which enhance quality control across Additive Manufacturing (AM) supply chains from which AM components are obtained. In various embodiments, the AMQM system includes an AM machine utilized to produce AM components in accordance with AM design data. A first sensor is coupled to the AM machine and, during fabrication of AM components by the AM machine, captures sensor readings pertaining to the AM fabrication process. When executed by a processor, computer-executable code causes the AMQM system to: (i) compile part-specific sensor profiles from sensor readings captured by the first sensor during fabrication of the AM components, and (ii) generate user notifications indicating whether remedial action should be performed for any of the AM components based, at least in part, on conformance of the part-specific sensor profiles with a baseline sensor profile corresponding to the AM design data.

19 Claims, 3 Drawing Sheets

(56) References Cited

U.S. PATENT DOCUMENTS

| | | | |
|---|---|---|---|
| 2015/0268099 A1* | 9/2015 | Craig | G01J 5/0003 |
| | | | 374/130 |
| 2016/0098825 A1* | 4/2016 | Dave | G06K 9/52 |
| | | | 419/53 |
| 2016/0184893 A1 | 6/2016 | Dave et al. | |
| 2016/0217518 A1 | 7/2016 | Shapiro | |
| 2016/0283833 A1 | 9/2016 | Peek | |
| 2017/0066084 A1 | 3/2017 | Ladewig et al. | |
| 2017/0157859 A1* | 6/2017 | Mahdavi | G06Q 50/04 |
| 2018/0062785 A1* | 3/2018 | Hodge | H04K 3/825 |

* cited by examiner

QUALITY MANAGEMENT SYSTEMS, METHODS, AND PROGRAM PRODUCTS FOR ADDITIVE MANUFACTURING SUPPLY CHAINS

TECHNICAL FIELD

The following disclosure relates generally to additive manufacturing and, more particularly, to systems, methods, and program products enhancing quality assuredness across additive manufacturing supply chains.

ACRONYMS AND ABBREVIATIONS

AM—Additive Manufacturing or Additively Manufactured;
AMQM—Additive Manufacturing Quality Management;
ATS—Air Turbine Starter;
CAD—Computer Aided Design;
CDN—Content Delivery Network;
DED—Direct Energy Deposition;
DMLS—Direct Metal Laser Sintering;
ECS—Environmental Control System;
FAA—Federal Aviation Administration;
FFF—Fused Filament Fabrication;
GTE—Gas Turbine Engine;
I/O—Input/Output;
LAN—Local Area Network;
SLA—Stereolithography;
VPN—Virtual Private Network;
WAN—Wide Area Network; and
3D—Three Dimensional.

BACKGROUND

As appearing herein, the term "additive manufacturing" and the corresponding abbreviation "AM" refer to computer-controlled manufacturing processes during which articles of manufacture are gradually built-up or compiled on a layer-by-layer basis in accordance with computer-readable AM design data. The term "AM processes" encompasses 3D printing processes including, but not limited to, SLA, FFF, and laser sintering (e.g., DMLS) processes. Similarly, articles of manufacture fabricated utilizing such AM processes are referred herein to as "additively manufactured components" or "AM components," the computer-controlled systems utilized to fabricate AM components are referred to as "additively manufacturing machines" or "AM machines," and the supply chains through which such parts are obtained are referred to as "additive manufacturing supply chains" or "AM supply chains."

AM components are gaining widespread acceptance in many industries. Certain industries, however, have proven resistant to adoption of AM components due, at least in part, to challenges related to quality control when such components are acquired through supply chains. Consider, for example, the aerospace industry. Regulatory bodies governing the aerospace industry, such as the FAA in the United States, are understandably circumspect regarding the usage of AM components in flight applications unless such components are thoroughly tested. However, the supply chains from which AM aerospace components may be obtained remain in relative infancy. To the extent such supply chains exist, they often contain part suppliers (herein, "vendors") lacking the capital resources and expertise to adequately validate AM aerospace components. Similar challenges likewise hamper widespread adoption of supply chain-provided AM components in other industries, as well. This may be particularly true for industries subject to stringent regulations or that otherwise require AM components to satisfy relatively demanding design constraints including, for example, the medical, automotive, and military industries.

There thus exists an ongoing commercial demand across multiple industries for the provision of systems and methods enhancing quality management of AM components obtained through supply chains. Ideally, such systems and methods could be implemented in a relatively seamless, cost-effective manner, while establishing high integrity, tamper-resistant quality control measures governing the production and distribution of AM components. It is further desirable to provide program products, such as software applications, which could facilitate implementation of such additive manufacturing management systems and methods. Other desirable features and characteristics of the present invention will become apparent from the subsequent Detailed Description and the appended Claims, taken in conjunction with the accompanying Drawings and the foregoing Background.

BRIEF SUMMARY

Additive Manufacturing Quality Management (AMQM) systems are provided, which enhance quality control of AM components obtained through supply chains. In various embodiments, the AMQM system includes an AM machine, such as a three dimensional (3D) printer, utilized to produce AM components in accordance with AM design data, such as one or more CAD files. A first sensor is coupled to the AM machine and, during fabrication of AM components by the AM machine, captures sensor readings pertaining to the AM fabrication process. In embodiments, the sensor readings may include or consist of layer-specific parameters captured during the AM production process; e.g., by way of non-limiting example, time-phased fusion temperatures may be recorded for each layer or for a subset of layers contained in a given AM component. A processor is coupled to the first sensor and is configured to access a computer-readable storage medium, which stores a computer-executable code. When executed by the processor, the computer-executable code causes the AMQM system to: (i) compile part-specific sensor profiles from sensor readings captured by the first sensor during fabrication of the AM components, and (ii) generate user notifications indicating whether remedial action should be performed for any of the AM components based, at least in part, on conformance of the part-specific sensor profiles with a baseline sensor profile corresponding to (previously generated for) the AM design data.

AMQM methods are further provided. Embodiments of the method may be performed by an AMQM system, which includes an AM machine configured to fabricate AM components in accordance with AM design data, a first sensor configured to capture sensor readings during fabrication of the AM components, and a processor coupled to the sensor. In certain implementations, the method may include the step or process of compiling, utilizing the processor, part-specific sensor profiles from the sensor readings captured by the first sensor during fabrication of the AM components by the AM machine. Notifications are then generated, at the AMQM system, to identify any AM components fabricated utilizing the AM machine and desirably subject to remedial action, as determined based, at least in part, on conformance between the part-specific sensor profiles and a baseline sensor profile correspond to the AM design data.

In further embodiments, the AMQM method may be performed by a server or "remote quality monitor" in communication with an AMQM system, which includes an AM machine configured to fabricate AM components in accordance with AM design data, a first sensor configured to capture sensor readings during fabrication of the AM components, and a processor coupled to the sensor. The method may include the step or process of receiving part-specific sensor profiles, which are compiled from the sensor readings captured by a first sensor during fabrication of AM components by the AM machine. The remote quality monitor may then determine whether any of the AM components are desirably subject to remedial action based, at least in part, on conformance of the part-specific sensor profiles to a baseline sensor profile corresponding to the AM design data. The remote quality monitor may transmit data to the AMQM system identifying which, if any, of the AM components are desirably subject to remedial action. The AMQM system may utilize such data in generating corresponding quality control notifications on a display device coupled to the processor. The quality control modifications may identify those AM components desirably subject to remedial actions and, in certain cases, may further indicate recommended remedial actions for any such non-conforming components.

The methods set-forth above and described elsewhere in this document can be implemented utilizing complementary program products, such as a software applications, executed on suitably-equipped AM machines and/or other systems in bidirectional communication with AM machines. Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present disclosure will hereinafter be described in conjunction with the following figures, wherein like numerals denote like elements, and.

DETAILED DESCRIPTION

Figure 1:
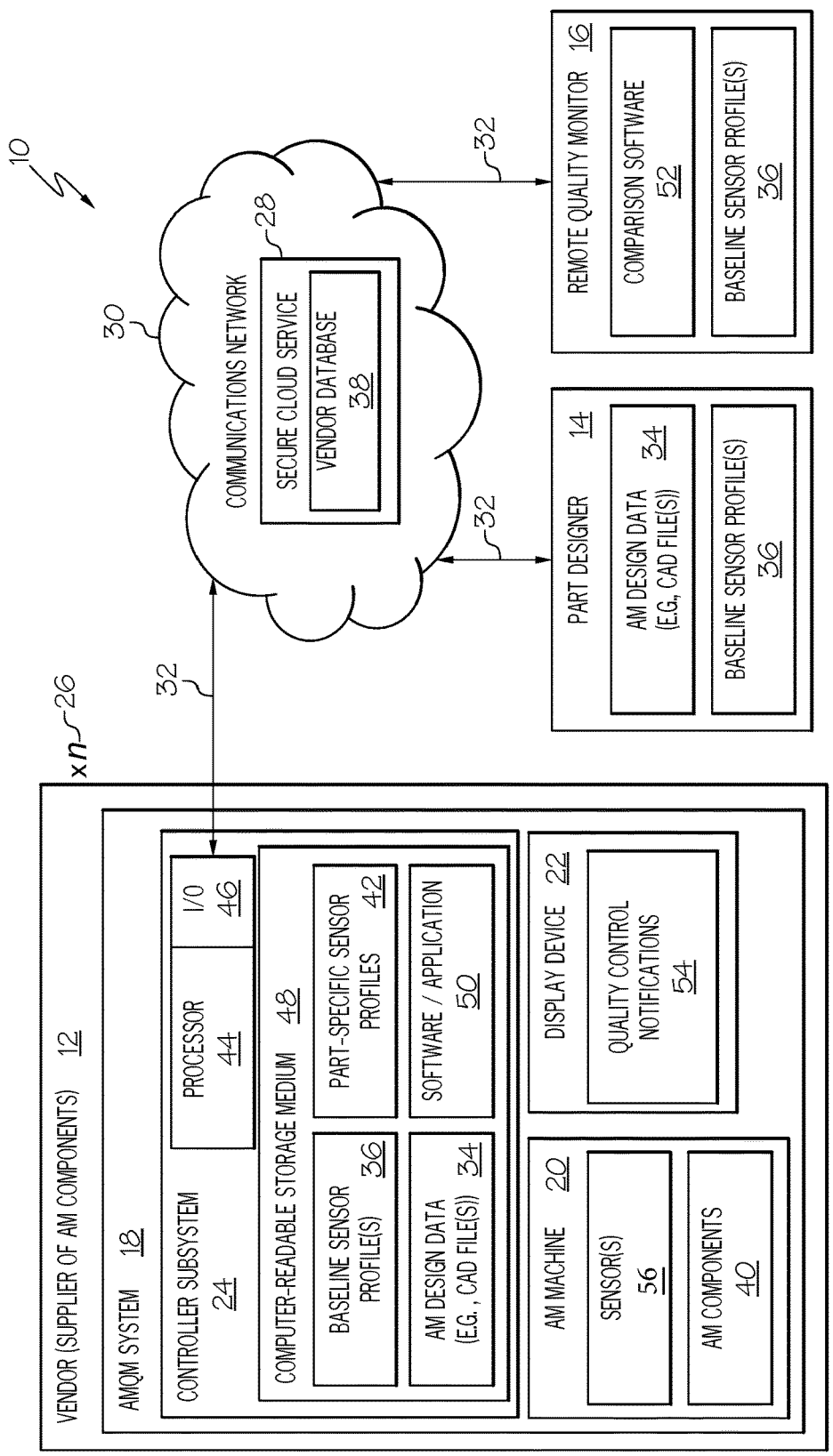
FIG. 1 is a schematic illustrating an AMQM architecture suitable for monitoring the quality of AM components obtained through a supply chain, as illustrated in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

Overview

The following describes Additive Manufacturing Quality Management (AMQM) systems and methods for enhancing quality control of AM components obtained through supply chains. Embodiments of the below-described AMQM systems may be operated by vendors (the supplier of AM parts) to fulfill purchase orders placed by part designers. A given supply chain may include only a part designer and any number of vendor. In certain cases, the supply chain or AMQM architectures may also include a third party entity or, which provides independent, offsite quality analysis of AM components produced by the vendor(s). When included in the supply chain or AMQM architectures, such a third party entity is referred to as a "remote quality monitor" and can be implemented as a cloud-based service, as described more fully below.

Increasingly, AM machines or apparatuses are equipped with sensors capable of recording readings or measurements gathered during the fabrication of AM components. The below-described AMQM systems leverage such sensor readings to compile part-specific sensor profiles, as may be gathered by the AMQM system during production of AM components by vendors in an AM supply chain. A given vendor may produce the AM components at the request of a part designer, which supplies computer-readable AM design data, such as one or more CAD files containing a virtual model of the desired part type. At chosen junctures during the AM production process, component quality (that is, the degree to which the AM components conform to design intent) is evaluated by comparing the part-specific sensor profiles to a baseline sensor profile, which corresponds to the AM design data. If a given part-specific sensor profile fails to adequately conform with the baseline sensor profile, the AM component corresponding to the part-specific sensor profile may be flagged for remedial action, such as further testing or rejection. Corresponding quality control notifications, such as displayed text annunciations, may be generated at the AM machine to convey which, if any, of the recently-produced AM components are desirably subject to remedial action. In certain cases, the notifications may include instructions indicating specific remedial actions to be performed by the vendor for any non-conforming AM components.

The baseline sensor profile may be established by the part designer or another entity by validating a number of initially produced AM prototypes or "AM proofing parts," which are subjected to and pass testing requirements. In this manner, the part designer (or another entity possessing sufficient knowledge and capital to adequately validate AM components at the direction of the part designer) can perform the desired validation processes utilizing the initially-produced AM proofing parts. Sensor profiles gathered for subsequently-fabricated production-run AM components, as manufactured by a vendor-operated AMQM system, can then be compared and contrasted against the baseline sensor profile utilizing specialized analysis software or algorithms. If the part-specific sensor profile for a given production-run AM component is sufficiently conformal with the baseline sensor profile, it can be determined with a relatively high degree of confidence that the given production-run AM component will likewise satisfy the design criteria tests applied to the validated AM proofing parts. Quality assuredness is thus greatly enhanced in the context of AM supply chains without requiring vendors, which often lack the financial resources and/or know-how to adequately validate AM components, to perform such tests. Furthermore, the cost of performing validation tests may be borne by the part designer rather than the vendor. In certain instances, such a process may minimize the number of the vendor-supplied AM components for which validations tests are required to reduce the overall cost of validating production-run AM components.

Comparisons between the part-specific sensor profiles and the baseline sensor profile can be conducted onsite (that is, by the AMQM system) or offsite by a remotely-located entity (again, referred to herein as a "remote quality monitor"). The remote quality monitor can be the part designer itself or, instead, a third party entity authorized by the part designer to perform such offsite validations. In either case, the validations may be availed to the vendor as part of a cloud-based AMQM service. When assuming the form of an entity (e.g., a cloud-based service) other than the part designer, the remote quality monitor may transmit a report to the part designer at a juncture following quality analysis of the part-specific sensor profiles gathered by the vendor-operated AMQM system. In this manner, an independent quality check is provided, which indicates when and if the vendor successfully fabricates a desired number of AM components with conforming sensor profiles. Similarly, in embodiments wherein the comparisons between the part-specific sensor profiles and the baseline sensor profile are conducted onsite by the AMQM system, the AMQM system may be configured to automatically transmit such quality analysis reports to the part designer and/or to the remote quality monitor for further quality assuredness. Moreover, local user access to such quality analysis reports and the baseline sensor profile, if locally stored by the AMQM system, may be restricted utilizing a unique passkey or may be entirely prevented to ensure data integrity.

The below-described AMQM systems and methods may be particularly useful for the production of AM components required to satisfy relatively stringent design parameters. One primary usage envisioned for the AMQM systems and methods described herein is connected to the production of aerospace components for flight applications. Such aerospace component may include, but are not limited to, GTE, ECS, and ATS components, to list but a few examples. This notwithstanding, the below-described systems and methods, and the program products through which such methods are conveniently implemented, are not restricted to usage within any particular industry or to the production of any particular part types. Instead, embodiments of the AMQM systems, methods, and program products may be beneficially employed across a wide range of industries including the automotive, medical, and military industries. Additional description of an exemplary, non-limiting AMQM architecture containing an AMQM system will now be described in conjunction with FIG. 1.

Example of AMQM Architecture

FIG. 1 is schematic diagram illustrating an overarching AMQM supply chain or architecture 10, as illustrated in accordance with an exemplary embodiment of the present disclosure. AMQM architecture 10 is generically depicted as including a part supplier or vendor 12, which operates an AMQM system 18. AMQM system 18 may be utilized to carry-out certain embodiments of the methods described herein, as described more fully below. While only a single vendor 12 is shown in detail in the schematic of FIG. 1, AMQM architecture 10 can contain (and embodiments of below-described AMQM method may be performed by) any practical number of vendors possessing suitably-equipped AMQM systems similar or identical to AMQM system 18. This is emphasized in FIG. 1 by symbol 26 ("xn") appearing adjacent the upper right corner of the box representing vendor 12.

In addition to vendor 12, AMQM architecture 10 further contains a part designer 14 and a remote quality monitor 16. Although illustrated conceptually as separate boxes in FIG. 1, part designer 14 and remote quality monitor 16 may be the same entity in embodiments wherein part designer 14 performs the below-described quality control analysis processes. Alternatively, remote quality monitor 16 may be realized as a separate, third party entity, which has been authorized by designer 14 to conduct the below-described quality control analyses. This includes instances in which remote quality monitor 16 is implemented as a software application or algorithm, which executes as a cloud-based service 28 as further indicated in FIG. 1 and discussed more fully below. As represented by double-headed arrows 32, bidirectional communication between vendor 12, part designer 14, and quality monitor 16 occurs over a communications network 30. Communications network 30 can encompass any network or group of networks enabling data transmission between vendor 12, part designer 14, and quality monitor 16. In this regard, communications network 30 can include one or more open CDNs, VPNs, the Internet, and various other communications networks implemented in accordance with TCP/IP protocol architectures or other conventional protocols. Network 30 may also encompass one or more wired or wireless LANs, WANs, a cellular network, and/or any other pubic or private networks.

AM design data 34 can contain any suitable file type and will often contain or consist of one or more CAD files, which may be generated by part designer 14 utilizing various different commercially-available CAD program products. A non-exhaustive list of such commercially-available CAD program products includes TOPSOLID, CATIA, CREO, AUTODESK INVENTOR, SOLIDWORKS, and NX CAD software packages. The term "AM design data," as appearing herein, thus broadly encompasses any computer-readable data or file types, which can be utilized by an AM machine to fabricate AM components in accordance with a predetermined design, regardless of the particular manner in which the data is stored or disseminated.

As generically illustrated in FIG. 1, at least one baseline sensor profile 36 is utilized to carry-out the quality comparison analysis. Part designer 14 may initially construct baseline sensor profile 36 by validating any desired number of AM proofing parts, which are produced by part designer 14 utilizing a non-illustrated AM machine, by vendor 12 utilizing AM machine 20, and/or by a different entity possessing a suitable-equipped AM machine. During production of the AM proofing parts, initial sensor profiles may be collected in the manner described below. Part designer 14, or another entity acting at the direction of designer 14, may then perform any number of tests on the AM proofing parts. The initially-gathered sensor profiles corresponding to those AM proofing parts, which pass testing or are otherwise validated, may then be utilized to construct baseline sensor profile 36. The particular type of test or tests conducted will vary amongst embodiments in relation to design requirements and other factors. In the case of AM GTE components, for example, such tests may be designed to evaluate crack propagation and growth propensity, tensile strengths, high temperature creep propensity, life cycle fatigue properties, and similar characteristics within the high temperature GTE environment. It is not uncommon for the aggregate cost to perform such tests to approach or exceed several hundred thousand United Stated dollars. Such costs may be prohibitive to vendors, such as vendor 12 shown in FIG. 1, and may thus impede usage of supply chains to obtained AM parts absent the AMQM system and methods described herein.

With continued reference to FIG. 1, a copy of baseline sensor profile 36 may be stored locally by AMQM system 18 in embodiments in which controller subsystem 24 conducts the below-described quality comparison analysis. In such implementations, local user access to and editing of baseline sensor profile 36 may be restricted or entirely prevented to ensure data integrity. Baseline sensor profile 36 may, however, be periodically updated by part designer 14 through secure cloud service 28. Finally, a further copy of baselines sensor profile 36 may be stored by remote quality monitor 16 in implementations wherein quality monitor 16 is utilized to perform offsite quality analysis in addition to or in lieu of onsite quality analysis. Again, although illustrated as external to secure cloud service 28 in FIG. 1, remote quality monitor 16 can be implemented in software, firmware, or the like executed by one or more distributed servers in communication via network 30 (colloquially, the "cloud"), in which case baseline sensor profile 36 may be stored within cloud service 28. In such embodiments, mutual authentication and encryption techniques may be employed for data security purposes. Secure cloud service 28 may thus only avail AMQM system 18 of protected data (e.g., AM design data 34) and access to the below-described quality management services following proper authentication of vendor 12. In this case, and as indicated in FIG. 1, secure cloud service 28 may maintain a database 38 of vendors approved by part designer 14. Vendor 12 may be required to unique, identifying information matching that stored in database 38 when establishing a data-sharing session with service 28/quality monitor 16 over communications network 30.

Vendor-operated AMQM system 18 will now be described in greater detail. In the illustrated example, AMQM system 18 includes an AM apparatus or machine 20, a display device 22, and a controller subsystem 24, which is operatively coupled to AM machine 20 and display device 22. Addressing first AM machine 20, AM machine 20 can assume the form of any apparatus, system, or device suitable for fabricating AM components by successively building-up such parts, on a layer-by-layer basis, in accordance with CAD data files or other computer-readable AM design data. As a first example, AM machine 20 can be a 3D printer capable of producing AM components utilizing an FFF AM processes. Alternatively, and as a second example, AM machine 20 may be an SLA or laser sintering (e.g., DMLS) apparatus. In many cases, AM machine 20 may be capable of producing metallic AM components by, for example, heating a metallic source material (e.g., supplied as a filament (wire), powder bed, actively-flowed powder, or the like) utilizing a suitable heat input source (e.g., a laser or an electron beam), which creates weld pools to fuse together the source material in a targeted manner to gradually build-up or successively compile the desired component. The metallic source material may be a superalloy, such a nickel-based or cobalt-based superalloy, in implementations in which AMQM system 18 is utilized to produce GTE or aerospace parts. In other embodiments, AM machine 20 may assume a different forms suitable for producing AM components or three dimensionally printed parts. The components fabricated utilizing AMQM system 18 are generically represented in FIG. 1 by box 40.

AM machine 20 is equipped with one or more sensors 56. Sensors 56 can assume any form suitable for capturing measurements or readings pertaining to AM components 40, while such components are produced by AM machine 20. In embodiments, sensors 56 include at least one temperature sensor, such as a pyrometer, capable of measuring local fusion temperatures captured during layer-by-layer build-up of AM components 40. When AM components 40 are fabricated from a metallic material, such temperature measurements may be referred to as "fusion" or "weld pool" temperature measurements. In certain implementations, such fusion temperature measurements are captured over a time frame encompassing immediately prior to, during, and immediately after application of heat input fusing the source material. This results in a fusion time-versus-temperature curve or characteristic, which can be gathered for each layer or for a subset of layers contained in each AM component 40. Collectively, this data may yield a part-specific sensor profile 42, which can be compared against baseline sensor profile 36 during the quality analysis process, as discussed more fully below in conjunction with FIGS. 3-4. Each part-specific sensor profile 42 can contain any number and type of data characteristics captured by sensors 56, with the discussion of time-phased temperature characteristics serving only as a useful and non-limiting example.

In addition to or in lieu of one or more temperature sensors, sensors 56 may further include sensors capable of capturing various other parameters relating to AM components 40. For example, sensors 56 may include one or more image sensors capable of capturing image data in the visible, infrared, and/or ultraviolet portions of the electromagnetic spectrums. Such image data may be utilized to calculate layer-by-layer dimensions of AM components, as captured during AM fabrication process and utilized to compile part-specific sensor profiles 42 and baseline sensor profile 36. In certain embodiments, sensors 56 may record or measure other parameters during the AM fabrication process, which do not directly pertain to AM components 40, but rather to the operating characteristics of AM machine 20, to the source material or materials from which AM components 40 are produced, to the internal environment within AM machine 20, and/or to the environment external to AM machine 20. With the understanding that such parameters will vary in conjunction with the type of AM machine utilized and similar factors, a non-exhaustive list of additional parameters that may be gathered by sensors 56 includes measurements pertaining to: room temperature, pressure, and humidity levels; and temperature, pressure, humidity, and gas (e.g., $O_2$) levels within the process chamber or "print bed" of AM machine 20. In embodiments, sensors 56 may also measure parameters relating to the operation of AM machine 20, such as chiller state, collector position, filter pressure, recoater position and speed, and dispenser position.

As previously noted, AMQM system 18 and, specifically, controller subsystem 24 compiles part-specific sensor profiles 42 for AM components 40 during fabrication of AM components 40. Controller subsystem 24 may perform quality analysis onsite by comparing and contrasting each part-specific sensor profile 42 with baseline sensor profile 36. Alternatively, controller subsystem 24 may transmit part-specific sensor profiles 42 over communications network 42 to remotely-located entity, such as remote quality monitor 16, which then conducts the quality analysis process utilizing the part-specific sensor profiles. As a further possibility, both controller subsystem 24 and remote quality monitor 16 may perform independent analyses to each evaluate component quality based, at least in part, upon the degree to which sensor profiles 42 conform to baseline sensor profile 36. To support such functionalities, controller subsystem 24 further includes at least one processor 44, I/O features 46, and a computer-readable memory or storage medium 48. Processor 44 is operably coupled to I/O features 46 and to storage medium 48. I/O features 46 can include a network interface, an interface to storage medium 48, an interface to display device 22, and any user input interfaces enabling local users to interact with and control AMQM system 18.

Storage medium 48 stores AM design data 34 and part-specific sensor profiles 36. Additionally, in embodiments wherein AMQM system 18 performs onsite quality analysis, storage medium 48 may further store baseline sensor profile 36 and specialized software application 50. Comparison software application 50 may contain computer-executable code that, when executed by processor 44, causes AMQM system 18 to perform the below-described AMQM process. Similarly, when utilized to perform offsite or independent quality analysis, remote quality monitor 16 may likewise contain suitable computer-executable comparison software 52. The foregoing components contained in controller subsystem 24 can each be implemented utilizing any suitable number and combination of known devices including microprocessors, memories, power supplies, storage devices, interface cards, and other standard components. Such components may include or cooperate with any number of software programs or instructions (e.g., software application 50) designed to carry-out the various methods, process tasks, encoding and decoding algorithms, and relevant display functions.

During operation of AMQM system 18, processor 44 selectively executes computer-readable code or instructions (herein, "software application 50"), which directs the various hardware features of AMQM system 18 to perform the functions described herein. Software application 50 interfaces with processor 44, storage medium 48, and I/O features 46 via any suitable operating system to provide these functionalities. Software application 50 can be provided to AMQM system 18 in any manner, including by download through communications network 30 from part designer 14 or secure cloud service 28. During the below-described AMQM process, control logic contained in software application 50 may control sensors 56, AM machine 20, and/or display device 22. Additionally, when executed, software application 50 may selectively generate quality control notifications 54 on a display screen of display device 22. Quality control notifications 54 may indicate which, if any of AM components 40 are desirably subject to remedial action. Additionally, in certain instances, quality control notifications 54 may be expressed as textual annunciations or readouts, which contain additional actions to be performed for those AM components 40 subject to remedial action. Software application 50 may further selectively establish connections through communications network with appropriate remote entities (e.g., secure cloud service 28, part designer 14, and/or remote quality monitor 16), as appropriate for a given implementation of the AMQM process. Additional description of exemplary AMQM processes will now be set-forth in conjunction with FIG. 2.

Examples of AMQM Processes

Figure 2:
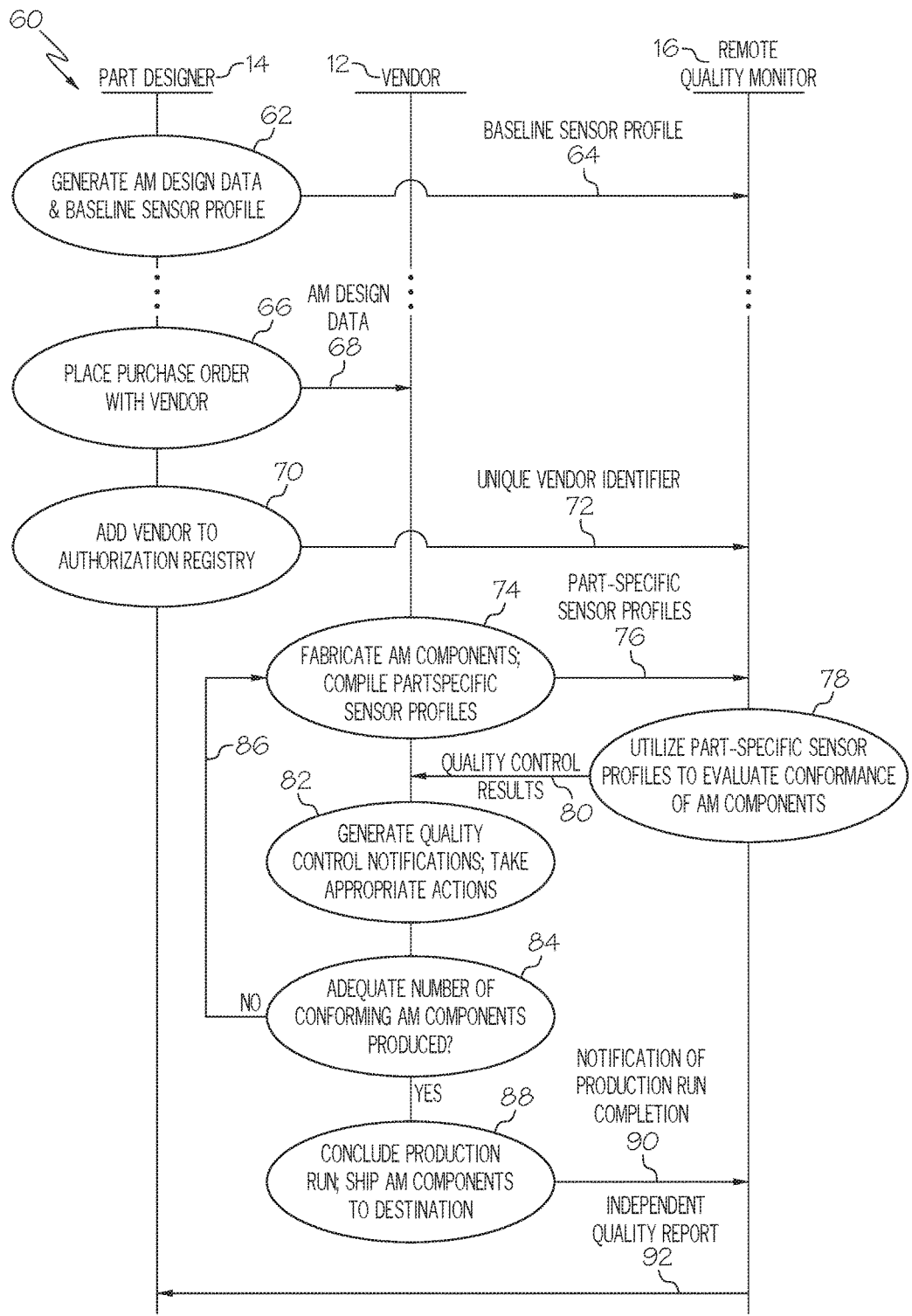
FIG. 2 is a message timing diagram of an exemplary transmission sequence between the vendor (the supplier of AM parts produced utilizing an AM machine), the quality monitor, and the part designer included in the AMQM architecture of FIG. 1, as illustrated in accordance with a further exemplary embodiment of the present disclosure.

FIG. 2 is a message timing diagram of an exemplary AMQM process 60, which may be carried-out between vendor 12, part designer 14, and remote quality monitor 16 in an exemplary embodiment of the present disclosure. In this particular example, quality control comparison are performed offsite by remote quality monitor 16. However, as previously noted, quality control comparison can also be performed onsite by AMQM system 18 in addition to or in lieu of offsite quality control analysis further embodiments of process 60.

Process 60 commences with the generation of AM design data (e.g., AM design data 34, FIG. 1) and a baseline sensor profile (e.g., baseline sensor profile 36, FIG. 1) by one or more entities, such as part designer 14 (FUNCTION 62, FIG. 2). AM design data can be one or more CAD files or similar computer-readable object data defining the 3D design of the components to be produced by vendor-operated AMQM system 18 (FIG. 1). The baseline sensor profile can be generated directly by part designer 14 or by a third party at the request of designer 14. The above-described processes can be utilized to generate the baseline sensor profile; e.g., as previously explained, proofing parts may be initially produced utilizing a suitably-equipped AM machine, the proofing parts may be tested, and sensor readings captured during production of those proofing parts validated through testing may then be utilized to generate the baseline sensor profile. In certain embodiments, one or more of the AM proofing parts may be fabricated by vendor 12 utilizing the same AMQM system subsequently used to fabricate the production-run AM components. The AM proofing parts may then be shipped or otherwise provided to part designer 14, or another entity associated with the part designer, for validation testing. Utilizing the same AMQM machine to fabricate the AM proofing parts and the vendor-supplied, production-run AM components in this manner may help account for variances between AMQM systems. In other embodiments, different AMQM machines may be utilized to fabricate the proofing parts and the vendor-supplied, production-run AM components. Once generated, part designer 14 may provide the baseline sensor profile to remote quality monitor 16 (FUNCTION 64, FIG. 2).

Following FUNCTION 64 (FIG. 2), part designer 14 may place a purchase order with vendor 12 and provides the corresponding AM design data to vendor 12 (FUNCTIONS 66, 68, FIG. 2). Afterwards or concurrently, part designer 14 may also provide information to remote quality monitor 16 for usage in subsequently authorizing vendor 12 as a trusted entity (FUNCTIONS 70, 72, FIG. 2). Data utilized in public-key encryption or private-key encryption techniques (e.g., as employed utilizing Advanced Encryption Standard (AES) standards) may be provided, with the appropriate key or keys provided to both vendor 12 and remote quality monitor 16. If vendor 12 is not currently listed within database 38, part designer 14 may instruct remote quality monitor 16 to add vendor 12 to vendor database 38 stored by secure cloud service 28 (FIG. 1).

Vendor 12 next utilizes AMQM system 18 (FIG. 1) to fabricate AM components in accordance with the AM design data previously forwarded by part designer 14 (FUNCTION 74, FIG. 2). As the AM components are produced, vendor 12/AMQM system 18 utilizes sensors 56 to capture sensor readings and compile part-specific sensor profiles. AMQM system 18 may capture such sensor readings automatically or in automated manner (that is, without requiring additional manual input by vendor 12) by execution of software application 50 (FIG. 1) by controller subsystem 24/processor 44. AMQM system 18 will typically compile the part-specific sensor profiles for all AM components produced by AM machine 20; however, this not necessary in all implementations. As discussed more fully below in conjunction with FIGS. 3 and 4, the parameters gathered to compile each part-specific sensor profile may include sensor measurements for every additively-built layer contained within a given AM component or, perhaps, for only a subset of layers. At a suitable juncture, vendor 12/AMQM system 18 then forwards the part-specific sensor profiles to remote quality monitor 16 (FUNCTION 76, FIG. 2). Again, this may occur as an encrypted transmission occurring over communications network 30 (FIG. 1). Vendor 12/AMQM system 18 may also append any such transmission to include unique information confirming the identity of vendor 12 for authentication purposes. One or more the part-specific sensor profiles may be transmitted to remote quality monitor 16 after the production of each AM component, after a predetermined number of AM components has been produced, or after the entire production run of the AM components has been fabricated.

After receiving sensor profiles 42 from vendor 12/AMQM system 18, remote quality monitor 16 utilizes the part-specific sensor profiles to evaluate the quality of the corresponding the AM components (FUNCTION 78, FIG. 2). The algorithm or algorithms utilized for this purpose, as contained in comparison software 52 (FIG. 1), will vary amongst embodiments, as will the degree to which the part-specific sensor profiles are permitted to deviate from the baseline sensor profile before the corresponding the AM components are deemed non-compliant and, thus, desirably subject to remedial action or corrective measures. Various aspects of the data sets may be compared and contrasted during the analysis process, with an example provided below in conjunction with FIGS. 3 and 4. The results of the quality control analysis are then returned to vendor 12/AMQM system 18 (FUNCTION 80, FIG. 2). At FUNCTION 82 (FIG. 2), the quality control results are then presented at AMQM system 18 as, for example, visual quality control notifications presented on display device 22 (FIG. 1). Audible alerts or advisory messages may also be provided, if desired.

The quality control notifications generated at FUNCTION 82 (FIG. 2) usefully indicate whether any of the AM components produced by AM machine 20 are desirably subject to remedial action. Such remedial action can include rejection or further testing of any non-conforming AM components. If the AM components are serialized, part serial numbers (or other such identifying information) may be contained in the quality control results. Recommended or required remedial actions might also be provided as part of the quality control notifications presented on the screen of display device 22 or otherwise generated at AMQM system 18. For example, in the case of an AM component for which the corresponding sensor profile is only moderately non-conformal with the baseline sensor profile, the recommended or required remedial action might be further testing or simple visual inspection of the corresponding AM component. Conversely, in the case of an AM component for which the corresponding sensor profile is severely non-conformal with the baseline sensor profile, scrapping of the AM component may be recommended or required. In certain embodiments, AMQM system 18 may temporarily halt fabrication of the AM components when determining that a currently-printed AM component is desirably subject to remedial action or when the part-specific sensor profile gathered for the AM component is severely non-conformal with the baseline sensor profile. In this manner, vendor 12 may be provided with a noticeable cue to ensure that AMQM system 18 is in proper working order before further printing of the AM components continues.

As indicated in FIG. 2 at FUNCTIONS 84, 86, the above-process steps (FUNCTIONS 74, 76, 78, 80, 82) may be repeated until such time as vendor 12/AMQM system 18 fabricates an adequate number of AM components having conforming sensor profiles. For example, AMQM system 18 may repeat these process steps until enough AM components having conforming sensor profiles are produced to satisfy the previously-placed purchase order. When this occurs, the AMQM method carried-out by AMQM system 18 concludes (FUNCTION 88, FIG. 2). Vendor 12 may then ship the AM components to the desired destination or destinations; e.g., the newly-fabricated AM component lot may be shipped to part designer 14 and/or another entity for further assembly and processing. Additionally, AMQM system 18, at the direction of software application 50, may transmit a notification of production run completion to remote quality monitor 16 (FUCNTION 90, FIG. 2). In response, remote quality monitor 16 may then generate an independent quality report, which is forwarded directly to part designer 14 (FUNCTION 92, FIG. 2). The independent quality report may indicate that vendor 12/AMQM system 18 has successfully produced an adequate number of AM components having conforming part-specific sensor profiles. This provides an independent check or quality assuredness measure in the AM supply chain.

Examples of Part-Specific Sensor Profiles

As a point of emphasis, various different types of sensor measurements may be gathered during the AM production process and utilized to construct the baseline sensor profile and part-specific sensor profiles described above. Similarly, embodiments of the systems, methods, and program products described herein can be utilized in conjunction with various different types of AM machines or apparatuses, as currently known and subsequently developed. This notwithstanding, a specific example of a part-specific sensor profile containing time-phased temperature measurements and collected utilizing a sensor-equipped DMLS machine will now be described in conjunction with FIGS. 3 and 4 to provide a useful, but non-limiting context in which embodiments of the present disclosure may be better understood.

Figure 3:
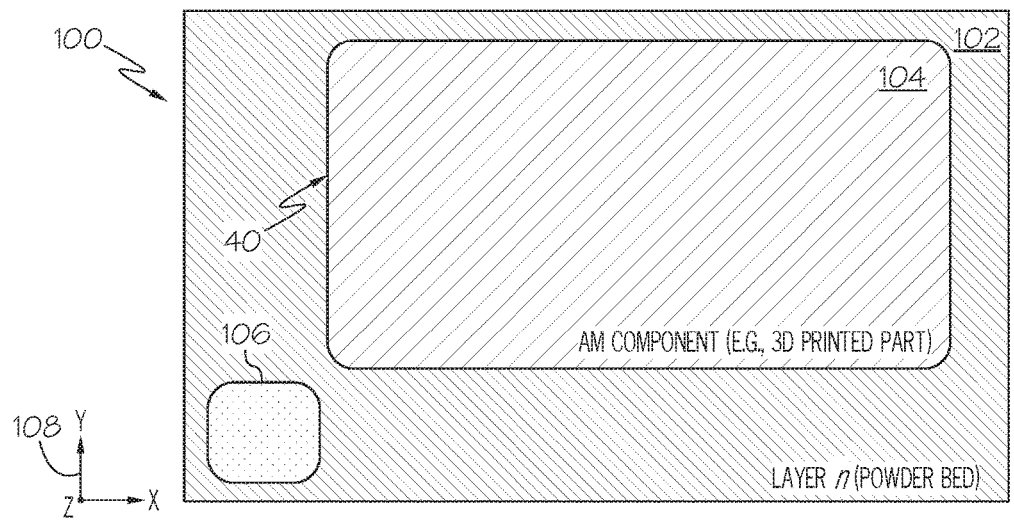
FIG. 3 is a top-down view of a powder bed included in an exemplary AM machine (here, a sensor-equipped DMLS machine), as illustrated during production of a generic AM component for which a part-specific sensor profile may be gathered.

FIG. 3 is a top-down view of a metallic powder bed 102 included in an exemplary DMLS machine 100, as illustrated during production of a generic AM component 40 for which a part-specific sensor profile may be gathered. DMLS machine 100 may correspond to AM machine 20 shown in FIG. 1 in an exemplary and non-limiting embodiment. DMLS machine 100 includes various other components, which are well-known in the relevant field and not shown in FIG. 3 to avoid obscuring the drawing. During production of AM component 40, a directed heat beam (laser or electron beam) is scanned over selected regions of metallic powder bed 102 to fuse layers of metal powder and gradually build-up or successively compile component 40 on a layer-by-layer basis. One such fused metal layer 104 included in component 40 (shown in a partially-completed state) is depicted in FIG. 3. In certain embodiments, a dummy structure (e.g., a column-like coupon 106) may be simultaneously produced in conjunction with AM component 40 for reasons explained more fully below. Coupon 106 thus represents a structure, which is printed concurrently with component 40, but which is physically separate or independent therefrom.

After selected regions of a given metallic layer included within AM component 40 are fused by controlled heat input, additional powder layers may then be applied over the recently-fused layer utilizing a non-illustrated powder delivery system (e.g., a roller-based recoater system). This process of dispensing a metallic powder layer, fusing selected regions of the metallic powder layer, and then apply a fresh metallic powder layer are repeated on an iterative basis. In this manner, numerous layers of fused metal are built-up or compiled in the Z-direction identified by coordinate legend 108 in FIG. 3 and complete AM component 40. In further embodiments, multiple AM components may be fabricated in parallel within metallic powder bed 102. In still further implementations, other types of metal AM processes can be employed to produce component 40 including DED metal AM processes in which a source metal is continually supplied to a fusion site as, for example, a flowing powder or actively-fed wire.

Figure 4:
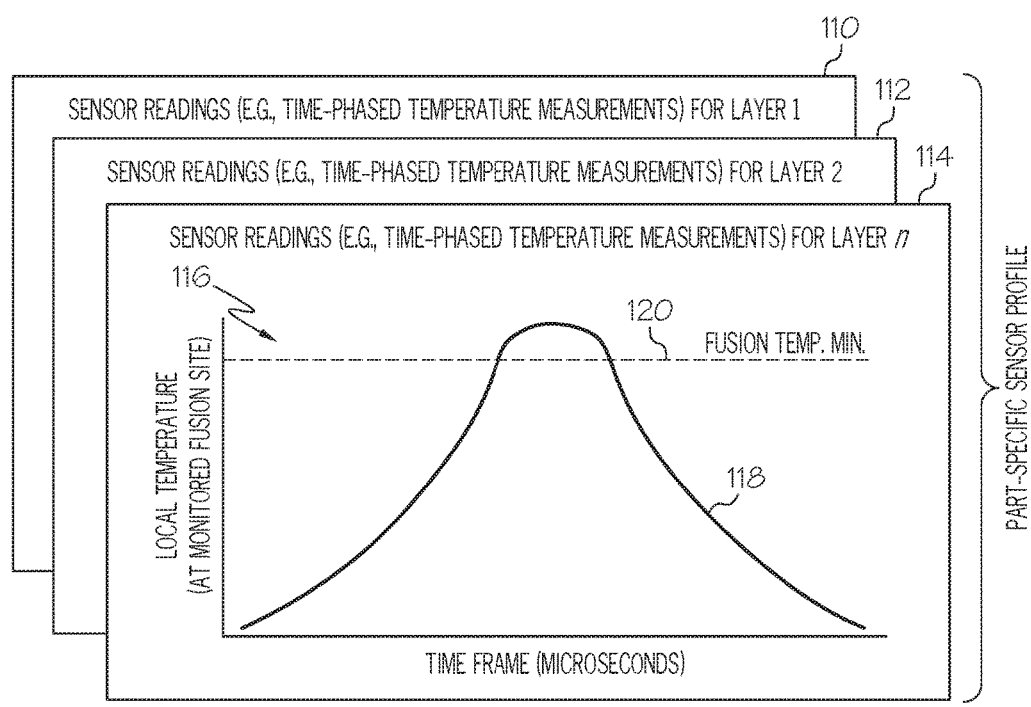
FIG. 4 is a diagram generically illustrating a part-specific sensor profile gathered by the sensor-equipped AM machine shown in FIG. 3 and containing a number of layer-specific sensor readings (here, time-phased temperature measurements), as illustrated in accordance with a still further exemplary embodiment of the present disclosure.

During fabrication of AM component 40, sensor readings are captured and utilized to produce a corresponding part-specific sensor profile. An example of such a part-specific sensor profile 110, 112, 114 is schematically shown in FIG. 4. In the embodiment of FIGS. 3 and 4, part-specific sensor profile 110, 112, 114 contains sensor readings for all layers contained within AM component 40. This is indicated in FIG. 4 by the labeled entitled "layer 1," layer 2," and a final "layer n," with the sensor readings for the intermediate layers between "layer 2" and "layer n" not shown for clarity. In further embodiments, such sensor readings may be gathered for only a subset of layers contained within AM component 40. For example, in implementations wherein AM component 40 contains a relatively large number of layers, sensor readings may only be gathered for every other layer, for every third layer, or for some other predetermined subset of the printed layers. In the illustrated example, the sensor readings are gathered as time-phased temperature measurements. One such time-phased temperature measurement is shown in FIG. 4 for layer n and identified by reference numeral "116." As can be seen, the time-phased temperature measurement 116 include a trace, curve, or characteristic 118 plotting local temperature-versus-time over a timeframe encompassing a fusion event. This data is referred to below as Fusion Temperature-versus-Time (FTT) characteristic.

During heating and fusion of selected regions of the powder layer, a FTT characteristic may be recorded for a given X-, Y-coordinate location (corresponding to coordinate legend 108, FIG. 3). The X-, Y-coordinate location may be coincident within an selected region of AM component 40 (FIG. 3) or, instead, may be coincident with another site of fusion remotely located from component 40. In certain implementations, the layer-specific FTT characteristics contained in part-specific sensor profile 110, 112, 114 can be recorded at a fixed X-, Y-coordinate location corresponding to coupon 106 in FIG. 3, which, as noted above, may be a column of material that is built-up at this location concurrently with the layer-by-layer (that is, Z-direction) fusion deposition of AM component 40. If at least one (or more than a predefined minimum number) of the layer-specific FTT characteristics included in part-specific sensor profile 110, 112, 114 fail to adequately conform with the corresponding FTT model characteristic or characteristics contained in the baseline sensor profile, AM component 40 may be flagged for remedial action during AMQM processes described above in conjunction with FIGS. 1 and 2. Such remedial action may entail testing, which, in this case, may involve additional inspection of AM component 40 part itself, testing of coupon 106 concurrently printed with AM component 40, or a combination thereof.

A comparative analysis is carried-out to determine whether a meaningful discrepancy exists between the baseline sensor profile (itself containing one or more FTT baseline characteristics) and the newly-collected FTT characteristics contained in part-specific sensor profile 110, 112, 114. When multiple layer-specific FTT characteristics are recorded during fabrication of AM component 40, each FTT characteristic may be compared to the FTT baseline sensor profile. If the FTT baseline sensor profile contains only a single FTT model characteristic, each layer-specific FTT characteristic contained in part-specific sensor profile 110, 112, 114 may be compared to the FTT model characteristic on an individual basis. If the FTT baseline sensor profile instead contains a plurality of (e.g., layer-specific) FTT characteristics, the layer-specific FTT characteristics contained in part-specific sensor profile 110, 112, 114 may each be compared to the corresponding FTT model characteristics; e.g., FTT model characteristic 110 gathered for layer 1 may be compared with a corresponding FTT model characteristic for layer 1 contained in the baseline sensor profile, FTT model characteristic 112 gathered during fusion of layer 2 may be compared with a corresponding FTT model characteristic for layer 2 contained in the baseline sensor profile, and so on.

Conformance with the baseline sensor profile may be determined utilizing an algorithm (e.g., as contained in software application 50, 52 in FIG. 1) adapted to analytically compare one or more parameters of layer-specific FTT characteristics contained in part-specific sensor profile 110, 112, 114 to the corresponding FTT characteristics in the baselines sensor profile. Such parameters can consider various deviations between different factors of the data sets including, for example, average slopes, bilateral symmetry (as divided at the peak recorded temperature), the magnitude of the maximum recorded temperature, and the like. Additionally, the duration of time at which the fusion or weld pool remains above a predetermined temperature (e.g., a minimum temperature or liquidation temperature at which fusion will occur), as indicated in FIG. 4 by horizontal line 120, may also be considered when comparing and contrasting a layer-specific FTT characteristic gathered during fabrication of a production run AM component with a corresponding layer-specific FTT characteristic contained within the baseline sensor profile. Stated differently, and referring briefly once again to FIG. 1, processor 44 executing software 50 may compare the time period over which the recorded fusion temperatures remain above a minimum fusion temperature (horizontal line 120, FIG. 4) in determining whether the part-specific sensor profiles adequately conform with the baseline sensor profile. Various other data analysis or comparison techniques can be utilized in further embodiments.

CONCLUSION

The foregoing has thus provided embodiments of AMQM systems and methods enabling improved quality management of AM components sourced through supply chains. The above-described AMQM processes provides versatile and powerful quality checks in the context of AM supply chains. This quality check can be performed on AM components produced by a wide range of vendors, regardless of location and whether a particular vendor lacks the financial resources and/or expertise to independently evaluate such parts. Embodiments of the above-described systems and methods can be implemented in a relatively seamless, cost-effective manner through the installation of software applications or program products operating on preexisting systems. Additionally, high integrity, tamper-resistant quality control measures governing the production and distribution of AM components are provided, at least in part, through the generation of quality control reports, which are transmitted to the part designer in an automated fashion by the AMQM system and/or by a remote quality monitor in communication with the AMQM system. Embodiments of the above-described AMQM systems and methods may be beneficially applied to the fabrication of AM aerospace and turbomachinery component including ECS, ATS, and GTE components. More generally, embodiments of the present disclosure can be utilized in conjunction with the fabrication of any type of AM component, without limitation, obtained through a supply chain and desirably subject to enhanced quality control measures.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An Additive Manufacturing Quality Management (AMQM) system, comprising:
    an Additive Manufacturing (AM) machine configured to fabricate AM components in accordance with AM design data;
    a temperature sensor configured to record fusion temperatures during fabrication of the AM components;
    a processor coupled to the temperature sensor; and
    a computer-readable storage medium storing a computer-executable code that, when executed by the processor, causes the AMQM system to:
        compile part-specific sensor profiles from sensor readings captured by the temperature sensor as the AM machine fabricates the AM components, each part-specific sensor profile containing sensor readings gathered as time-phased temperature measurements that include a characteristic plotting local temperature-versus-time over a timeframe encompassing a fusion event for a layer of one of the AM components; and
        generate and output notifications for display on a display device associated with the AMQM system indicating that the one of the AM components produced by the AM machine is subject to remedial action based on a conformance of the part-specific sensor profiles of the one of the AM components with a baseline sensor profile corresponding to the AM design data.

2. The AMQM system of claim 1 wherein the computer-executable code, when executed, causes the AMQM system to further perform the operations of:
    transmit the part-specific sensor profiles to a first remote entity over a communications network; and
    in response to transmission of the part-specific sensor profiles, receive data indicating whether any of the AM components are subject to remedial action based, at least in part, on comparisons of the part-specific sensor profiles to the baseline sensor profile performed by the first remote entity.

3. The AMQM system of claim 1 wherein the baseline sensor profile is stored in the computer-readable storage medium; and
    wherein the computer-executable code, when executed, causes the AMQM system to further perform the operations of:
    recalling the baseline sensor profile from the computer-readable storage medium; and
    performing an on-site comparison between the part-specific sensor profiles and the baseline sensor profile.

4. The AMQM system of claim 3 wherein the computer-executable code, when executed, causes the AMQM system to further perform the operations of:
    after performing the on-site comparison between the part-specific sensor profiles and the baseline sensor profile, transmit data to a remote entity reporting the results of the on-site comparison.

5. The AMQM system of claim 3 wherein the computer-executable code, when executed, further causes the AMQM system to restrict access to the baseline sensor profile to authorized users.

6. The AMQM system of claim 1:
    wherein the computer-executable code, when executed, causes the AMQM system to further generate the notifications as textual annunciations on the display device; and
    wherein the textual annunciations comprise instructions for additional actions to be performed for the one of the AM components subject to remedial action.

7. The AMQM system of claim 1 wherein the processor is configured to compare a time period over which the recorded fusion temperatures remain above a minimum fusion temperature in determining whether the part-specific sensor profiles adequately conform with the baseline sensor profile corresponding to the AM design data.

8. The AMQM system of claim 1 wherein the computer-executable code, when executed, further causes the AMQM system to temporarily halt fabrication of the AM components when determining that the one of the AM components is subject to remedial action.

9. The AMQM system of claim 1 wherein each of the part-specific sensor profiles contain sensor readings gathered for a fixed coordinate location at a site of fusion associated with the fabrication of the one of the AM components, and the site of fusion is remote from the one of the AM components.

10. A method performed in conjunction with an Additive Manufacturing Quality Management (AMQM) system including an AM machine configured to fabricate AM components in accordance with AM design data, a temperature sensor configured to record fusion temperatures during fabrication of the AM components, and a processor coupled to the temperature sensor, the method comprising:
    compiling, by the processor, part-specific sensor profiles from the sensor readings captured by the temperature sensor during fabrication of the AM components by the AM machine, each part-specific sensor profile containing sensor readings gathered as time-phased temperature measurements that include a characteristic plotting local temperature-versus-time over a timeframe encompassing a fusion event for a layer of one of the AM components; and
    generating, by the processor, notifications for display on a display device associated with the AMQM system indicating the one of the AM components is subject to remedial action based on a comparison between the part-specific sensor profiles of the one of the AM components and a baseline sensor profile corresponding to the AM design data.

11. The method of claim 10 further comprising:
transmitting the part-specific sensor profiles to a first remote entity over a communications network; and
in response to transmitting the part-specific sensor profiles, receiving data indicating whether any of the AM components are subject to remedial action based, at least in part, on comparisons of the part-specific sensor profiles to the baseline sensor profile performed by the first remote entity.

12. The method of claim 10 further comprising:
recalling the baseline sensor profile from a computer-readable storage medium; and
performing an on-site comparison between the part-specific sensor profiles and the baseline sensor profile.

13. The method of claim 12 further comprising transmitting data over a communications network to a remote entity reporting the results of the on-site comparison.

14. The method of claim 10:
wherein, when executed by the processor, a computer-executable code causes the AMQM system to generate the notifications as textual annunciations on the display device; and
wherein the textual annunciations further include instructions for additional actions to be performed for any of the AM components subject to remedial action.

15. A method performed in conjunction with an Additive Manufacturing Quality Management (AMQM) system including an AM machine configured to fabricate AM components in accordance with AM design data, a temperature sensor configured to record fusion temperatures during fabrication of the AM components, and a processor coupled to the temperature sensor, the method comprising:
compiling, by the processor, part-specific sensor profiles for a fixed coordinate location at a site of fusion associated with fabrication of the AM components from the sensor readings captured by the temperature sensor during the fabrication of AM components by the AM machine, each part-specific sensor profile containing sensor readings at the fixed coordinate location gathered as time-phased temperature measurements that include a characteristic plotting local temperature-versus-time over a timeframe encompassing a fusion event for a layer of one of the AM components;
determining, by the processor, the one of the AM components is subject to remedial action based on comparisons between the part-specific sensor profiles of the one of the AM components and a baseline sensor profile corresponding to the AM design data; and
generating, by the processor, notifications for display on a display device associated with the AMQM system indicating the one of the AM components is subject to remedial action based on the determining.

16. The method of claim 15 further comprising receiving, by the processor, recommended remedial actions for any AM components desirably subject to remedial action.

17. The method of claim 15 wherein the AM design data is created by a part designer, and wherein the method further comprises verifying that the AMQM system is validated by the part designer prior to determining the one of the AM components is subject to remedial action.

18. The method of claim 15 wherein the method further comprises determining the one of the AM components is subject to remedial action based on comparisons between the local temperature-versus-time over a timeframe encompassing the fusion event for the layer and a baseline local temperature-versus-time over the timeframe encompassing the fusion event for the layer corresponding to the AM design data.

19. The method of claim 15 wherein the AMQM system is operated by a vendor, and wherein the method further comprises:
storing a vendor database in a memory; and
confirming that the vendor is listed within the vendor database and transmitting data to the AMQM system identifying the one of the AM components is subject to remedial action.

* * * * *